M. BORISLAVSKY.
APPARATUS FOR CLEANING AND DRYING GRAIN.
APPLICATION FILED SEPT. 5, 1913.
1,225,403.
Patented May 8, 1917.
2 SHEETS—SHEET 1.
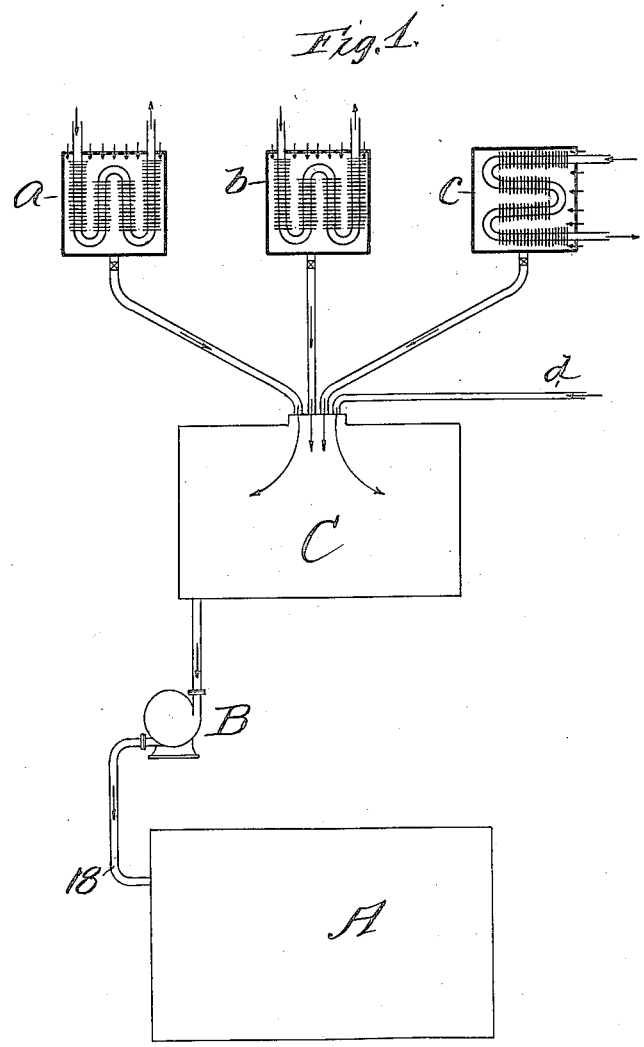

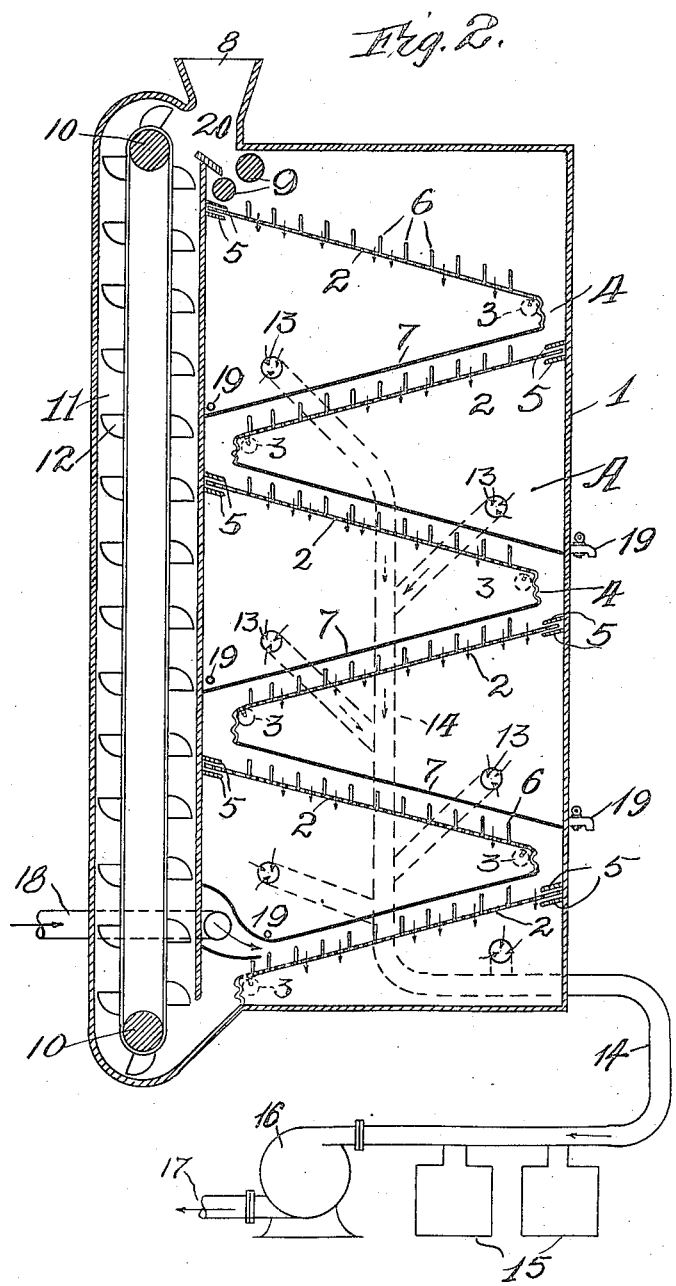

UNITED STATES PATENT OFFICE.

MICHAEL BORISLAVSKY, OF MINSK, RUSSIA.

APPARATUS FOR CLEANING AND DRYING GRAIN.

1,225,403.

Specification of Letters Patent. Patented May 8, 1917.

Application filed September 5, 1913. Serial No. 788,267.

*To all whom it may concern:*

Be it known that I, MICHAEL BORISLAVSKY, a subject of the Czar of Russia, and residing at Minsk, in the Empire of Russia, have invented certain new and useful Improvements in Apparatus for Cleaning and Drying Grain, of which the following is a specification.

My invention has for its object to prepare grain before it is finally operated on, that is to say to dry and clean it, and to do the former without regard to weather conditions, the weather often spoiling large quantities of grain, and also in such a manner as not to injure the quality of the grain. This object I attain by regulating the temperature of the air used for drying the grain by the use of a special regulating chamber.

My new apparatus is shown in the drawings, where Figure 1 shows diagrammatically the general arrangement of the apparatus, and Fig. 2 the construction of the grain cleaner in a sectional view.

According to my invention a series of heat accumulators is fitted, for instance: $a$ for high temperature, $b$ for medium and $c$ for low temperature. Pipes lead from these accumulators to the regulating chamber C, to which a pipe $d$ for the admission of fresh air is also connected. By adjusting the valves in these various pipes it is possible to produce in the regulating chamber C the temperature, best adapted to each case, of air, which is drawn from the chamber C by the fan B. If it is necessary to kill parasites in the grain, an air temperature of about 150° is required, whereas for cooling the grain cooler air is used and for simply winnowing it, the pipe $d$ alone is opened. The fan B forces the air prepared in the regulating chamber through the grain cleaning machine A, which is constructed as follows:

In the casing 1 is fitted a set of inclined sieves 2 one above the other, the upper ends of which slide in the guides 5, while the lower ends are given an oscillating motion by eccentrically journaled rollers 3, which can be made to revolve in any desired way, the lower ends of the sieves being connected by an elastic air-tight wall 4, with an incline 7 adapted to the next lower sieve 2.

Thus between each sieve 2 and its incline 7 is formed an inclosed space, whence the air is drawn through an opening 13 into a pipe 14, for which purpose a fan 16 is connected to said pipe, the withdrawn air being discharged through a pipe 17. With the pipe 14 is connected a dust-collector 15. Where the grain enters the casing 1, above the top sieve, is provided a pair of rollers 9 for distributing the grain uniformly, and in front of them is a guide plate 20 below the funnel-shaped feed inlet 8. The pipe 18 leading from the fan B (Fig. 1) enters the casing 1 from underneath. At the side, along the wall of the casing 1, is arranged a vertical conveyer, comprising two rotatable shafts 10 an endless chain 11 passing over them, and carrying buckets 12. The conveyer, like the crank for revolving the rollers 3, can derive its motion from any convenient source of power. To prevent the grain from rolling down the sieves 2 at too great a velocity, bars 6 are provided in rows on the sieves. For cleaning (by blowing air through) the inclosed spaces between the sieves 2 and the incline 7 cocks 19 in the lower part of said spaces are provided. The sieves 2 are so selected as to suit the size of the grain to be cleaned, so that the grain cannot pass through the mesh of the sieve.

The whole apparatus works as follows:

Through the inlet 8 the grain to be dried and cleaned is fed into the grain cleaning machine A, and after having passed between the rollers 9, it drops on to the first sieve and goes on gradually reaching the bottom sieve, whence the buckets of the conveyer, lift it again to the top. During all this time the grain is met by a stream of air at the required temperature supplied by the fan B through the pipe 18, which air in rising is gradually drawn through the sieves 2 and together with the dust through the opening 13 enters the pipe 14, through which the dust, etc. is carried off to the dust-collector 15 whereas the air by the fan 16 may be discharged into a furnace. The temperature of the air, entering the machine A, is regulated, as already explained, by being led into the regulating chamber C, according to the temperature required from either the accumulator $a$, $b$ or $c$. Thus, at first very hot air may be used in the machine A to kill the parasites and to dry the grain, then cooler air to cool the grain and finally after the grain has been sufficiently dried, ordinary air may enter the regulator C through the pipe $d$.

I claim as my invention.

1. Apparatus for cleaning and drying grain, comprising a casing, a plurality of movable sieves arranged therein so as to continuously conduct the grain through the casing, partitions flexibly connected to said sieves to form therewith separate closed compartments, each having an outlet opening, a common conduit connected to said outlet openings, a suction pump in said conduit, an air chamber, a plurality of apparatus for supplying to said chamber air at various temperatures, means for controlling the supply of air from each of said apparatus, means connecting said air chamber with said casing, and a fan in said connecting means for forcing the air from said chamber through said casing.

2. Apparatus for cleaning and drying grain, comprising a casing, a plurality of movable sieves arranged therein so as to continuously conduct the grain through the casing, partitions flexibly connected to said sieves to form therewith separate closed compartments each having an outlet opening, a common conduit connected to said outlet openings, a suction pump in said conduit, an air chamber, a plurality of apparatus for supplying to said air chamber air at various temperatures, means for controlling the supply of air from each of said apparatus, means connecting said air chamber with said casing, a fan in said connecting means for forcing the air from said chamber through said casing, and a dust collector connected to said conduit.

In testimony whereof I affix my signature in presence of two witnesses.

COLONEL MICHAEL BORISLAVSKY.

Witnesses:
 O. P. STURK,
 AUG UIGHIS.